United States Patent Office 3,100,766
Patented Aug. 13, 1963

3,100,766
METALLIZED AZO DYES FROM 2-AMINO-PYRIDINE-1-OXIDE
Charles E. Lewis, Somerville, N.J., assignor to American Cyanamid Company, New York, N.Y., a corporation of Maine
No Drawing. Filed May 19, 1961, Ser. No. 111,134
3 Claims. (Cl. 260—146)

This invention relates to new metallized azo compounds which are useful as dyestuffs, especially for fibers such as wool and silk; the linear polyamides, e.g., nylon; and the proteinaceous fibers prepared from natural proteins as disclosed in Man-Man Textile Encyclopedia (pp. 109–111).

Metallization of certain azo dyestuffs for the purpose of increasing their light stability has been known. Various attempts have been made to utilize this principle for increasing the stability of dyestuffs from azopyridine-N-oxides and azoquinoline-N-oxides. However, such N-oxides did not lend themselves to successful metallization. Thus, metal complexes could not be formed from either 2-(p-dimethylaminophenylazo)-pyridine-N-oxide, 4-(4-hydroxy-1-naphthylazo)-pyridine-N-oxide or 4-(4-hydroxy-1-naphthylazo)-quinoline-N-oxide.

It is an object of this invention to provide metallized derivatives of arylazo monazine-N-oxides which are useful in dyeing nitrogenous fibers.

It is a further object of this invention to provide nitrogenous fibers dyed with metallized derivatives of arylazo-monazine-N-oxides of the class hereinafter described.

In accordance with this invention it has been found that metals having an atomic number greater than 23 and less than 30 (i.e., Cr, Mn, Fe, Co, Ni and Cu) form complexes with 2-(R-azo)-monazine-N-oxides wherein the monazine radical has less than three six-membered rings (e.g., pyridyl and quinolyl) and R is a radical of the group

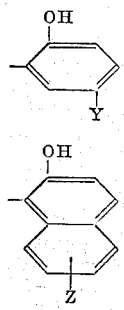

and

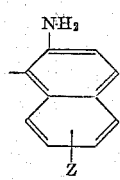

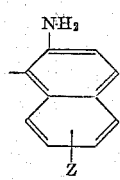

wherein Y is hydrogen or lower alkyl; and Z is hydrogen, sulfamyl, sulfo, halo (e.g. chloro, bromo and iodo), and alkyl (e.g., lower alkyl such as methyl, ethyl and propyl), which complexes dye nitrogenous fibers level, deep shades when applied by conventional neutral dyeing methods.

The metallized dyes of this invention are prepared by reacting a 2-(R-azo)monazine-N-oxide, as above defined with a salt of a metal having an atomic number greater than 23 and less than 30.

The metallization reaction is preferably conducted by heating the N-oxide with from about 0.5 to about 2 moles of the metal salt in an organic solvent such as dimethylformamide, formamide, pyridine, aniline or an alcohol. Reaction temperatures are from about 75–150° C. preferably within the range of about 90° to about 140° C. Metallization will go to substantial completion in a period of less than about 3 or 4 hours. After metallization, the metal complex is readily separated from the reaction mixture by drowning in water and filtration of the resulting precipitate.

Among the metal salts useful for the purpose of this invention may be mentioned salts of inorganic acids such as sulfuric, nitric and hydrochloric acids; and salts of organic acids such as formic, acetic and lactic acids.

Among the N-oxides useful for the purposes of this invention are:

(1) 2-(2-hydroxy - 5 - Y - phenylazo) - pyridine - N-oxides such as the derivatives wherein Y is hydrogen or methyl.

(2) 2-(2-hydroxy-5,6,7 or 8-Z-1-naphthylazo) - pyridine-N-oxides, wherein Z is a hydrogen, 6-sulfamyl, 7-chloro or 6-methyl;

(3) 2-(2-amino-5,6,7 or 8-Z-1-naphthylazo)-pyridine-N-oxides wherein Z is hydrogen, 6-sulfo, 7-bromo or 5-methyl;

(4) 2-(2-hydroxy - 5 - Y - phenylazo) - quinoline - N-oxides such as the derivatives wherein Y is hydrogen or methyl.

(5) 2-(2-hydroxy-5,6,7 or 8-Z-1-naphthylazo)-quinoline-N-oxides wherein Z is hydrogen, 7-sulfamyl, 6-bromo or 5-methyl; and (6) 2 - (2-amino - 5,6,7 or 8-Z-1-naphthylazo)-quinoline-N-oxides wherein Z is a hydrogen, 6-sulfo, 7-bromo or 5-methyl.

Where the desired N-oxide starting material is not known, it may be prepared by diazotizing 2-amino-pyridine-N-oxide or 2-amino-quinoline-N-oxide, as the case may be, coupling with the coupling agent corresponding to the "R" radical shown on the azo linkage of the starting material. Diazotization, coupling agents, coupling conditions useful for this purpose are conventional in the art.

The metallized azo dyes of the present invention have affinity for wool, silk, linear polyamide and artificial proteinaceous fibers, which they dye level, deep reddish shades. They are generally applied by the so called "neutral" dyeing method which employs ammonium acetate or acetic acid in small amounts to give the dyeing bath a weakly acidic pH. They exhaust well and give level shades.

The following examples are presented to more fully illustrate the present invention. Parts are by weight unless otherwise noted.

*Example 1*

(A)
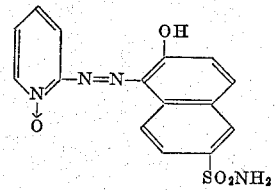

11.0 parts of 2-aminopyridine-1-oxide are dissolved in 160 parts of 7.5% hydrochloric acid and cooled to 0° C. 6.9 parts of sodium nitrite dissolved in 13.4 parts of water are added all at once and stirred at 0° C. for 15 min. until diazotization is complete. (An orange color develops.)

23.7 parts of real 2-naphthol-6-sulfonamide are dissolved in 420 parts of water containing 8 parts of sodium until uniform, filtered, washed with cold water and dried at 50° C. It is then recrystallized from 50% ethanol.

(B) *Copperization of the products of part A.*—1.32 parts of the product of part A, 1.0 part of cupric acetate monohydrate slurried in 25 parts by volume of formamide are heated three hours at 90–100° C. The whole is then cooled, diluted with an equal volume of water and filtered.

sulfo, halo and lower alkyl; and the metal has an atomic number greater than 23 and less than 30.

2. The chromium complex of 2-(2-hydroxy-5-sulfamyl-1-naphthylazo)-pyridine-N-oxide.

3. The copper complex of 2-(2-hydroxy-1-naphthylazo)-pyridine-N-oxide.

References Cited in the file of this patent

UNITED STATES PATENTS

| | | |
|---|---|---|
| 1,827,680 | Tisza et al. | Oct. 13, 1931 |
| 2,903,324 | Hirsbrunner | Sept. 8, 1959 |
| 2,929,809 | Menzi et al. | Mar. 22, 1960 |
| 2,957,862 | Riat et al. | Oct. 25, 1960 |
| 2,987,368 | Bene | June 6, 1961 |

OTHER REFERENCES

Cheng et al.: "Analytical Chemistry," vol. 27, No. 5, May 1955, pp. 782–785, (Available in Div. 59.)

Colonna et al.: "Gazz. Chim. Ital." vol. 85, November 1955, pp. 1508–1518. (Available in Scientific Library.)